(12) United States Patent
Ghosh

(10) Patent No.: US 7,027,538 B2
(45) Date of Patent: Apr. 11, 2006

(54) METHOD AND SYSTEM FOR JOINT DECISION FEEDBACK EQUALIZATION AND COMPLEMENTARY CODE KEY DECODING USING A TRELLIS

(75) Inventor: Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 792 days.

(21) Appl. No.: 10/075,312

(22) Filed: Feb. 14, 2002

(65) Prior Publication Data

US 2003/0152176 A1 Aug. 14, 2003

(51) Int. Cl.
*H04B 1/10* (2006.01)

(52) U.S. Cl. ............... 375/350; 375/346; 375/316; 455/307; 708/300

(58) Field of Classification Search .......... 375/285, 375/316, 346, 350; 327/210; 348/607; 455/296
See application file for complete search history.

(56) References Cited

U.S. PATENT DOCUMENTS

| | | | |
|---|---|---|---|
| 5,453,797 A | 9/1995 | Nicolas | 348/607 |
| 5,561,687 A | 10/1996 | Turner | 375/233 |
| 6,177,951 B1 | 1/2001 | Ghosh | 348/21 |
| 6,233,273 B1 | 5/2001 | Webster et al. | 375/148 |

FOREIGN PATENT DOCUMENTS

| | | |
|---|---|---|
| EP | 0808046 A2 | 11/1997 |
| WO | WO0001085 | 1/2000 |
| WO | WO0072540 | 11/2000 |

*Primary Examiner*—Stephen Chin
*Assistant Examiner*—Erin M. File
(74) *Attorney, Agent, or Firm*—Larry Liberchuk

(57) ABSTRACT

A method and system for performing joint equalization and decoding of Complementary Code Key (CCK) encoded symbols. The system comprises: a decision feedback equalizer (DFE) structure for simulating an inverse communications channel response and providing an output comprising an estimation of the received symbols, the DFE structure including a forward equalizer path and a feedback equalizer path including a feedback filter; and, a CCK decoder embedded in the feedback path and operating in conjunction with a feedback filter therein for decoding the chips based on intermediate DFE outputs including those chips corresponding to past decoded CCK symbols. Decisions on a symbol chip at a particular time are not made until an entire CCK codeword that the chip belongs to is decoded, thereby reducing errors propagated when decoding the symbols. Advantageously, the trellis decoding method is implemented as a computationally efficient 64-state trellis.

30 Claims, 2 Drawing Sheets

METHOD AND SYSTEM FOR JOINT DECISION FEEDBACK EQUALIZATION AND COMPLEMENTARY CODE KEY DECODING USING A TRELLIS

CROSS-REFERENCE TO RELATED APPLICATIONS

This application is related to applicant's co-pending U.S. patent application Ser. No. 09/107,546 filed Jun. 30, 1998 entitled METHOD AND DEVICE FOR IMPROVING DFE PERFORMANCE IN A TRELLIS-CODED SYSTEM, the whole contents and disclosure of which is incorporated by reference as if fully set forth herein.

BACKGROUND OF THE INVENTION

1. Field of the Invention

This invention generally relates to digital communication systems, and more specifically, to an enhanced system and method for performing feedback equalization and complementary code key (CCK) decoding using a trellis structure.

2. Prior Art

In many digital communication scenarios (e.g. telephone transmission, broadcast TV transmission, cable etc.). The transmitted signal arrives at the receiver through more than one path in addition to the direct path. This condition is called "multipath" and leads to intersymbol interference ("ISI") in the digital symbol stream. This ISI is compensated for in the receiver through an equalizer which in many cases is a DFE as shown in FIG. 1. U.S. Pat. No. 5,572,262 shows one method of combating these multipaths.

A DFE 10 (FIG. 1) has two filter sections, a forward filter 12 and a feedback filter 16. The input to the forward filter 12 is the received data which includes the transmitted symbol sequence $a_k$, noise $n_k$ and multipath $h_i$. The input to the feedback filter is the quantized equalizer output $\hat{a}_k$. The output of both the sections are summed 18 to form the final equalizer output $\tilde{a}_k$ 19 which is also the input to the next stage in a trellis-coded system, the trellis decoder. While a DFE performs better than a linear equalizer in severe ISI, the performance is limited by error propagation through the feedback filter 16 of the DFE 10. Error propagation occurs in the feedback filter 16 when the quantized equalizer output $\hat{a}_k$ is not the same as the transmitted symbol $a_k$. If an error is made in determining the symbol $\hat{a}_k$ at the output of the slicer 14, this incorrect symbol is fed back to the input of the feedback filter 16 and propagates. As known, the slicer 14 quantizes the filtered signal, providing an estimate of the symbol received. In many systems which employ error correction codes like trellis codes and/or Reed-Solomon codes to obtain very low error rates at moderate SNRs, the "raw" symbol error rate (SER) at the equalizer output can be extremely high. For example, in a Vestigal Sideband (VSB) system, at threshold in white noise the SER at the equalizer output is about 0.2. The increased error propagation due to these high SERs can cause the DFE to lose a couple of db in performance as compared to the case of no error propagation. Additionally, the error propagation causes the error sequence at the equalizer output to be correlated, since it depends on past incorrect symbol decisions. This correlation has an adverse effect on the subsequent trellis decoder which is usually designed for a white noise sequence.

According to the IEEE 802.11b high-rate wireless communications standard implementing direct sequence spread spectra techniques, bit stream data may be encoded using a standard known as Complementary Code Keying (CCK). This CCK encoding scheme is used to achieve 5.5 Mbps or 11 Mbps in wireless LANs. Rather than using the Barker code, which is the standard 11-bit chipping sequence used to encode data bits, CCK requires that data be encoded using a series of codes called Complementary Sequences. Because there are 256 unique code words that can be used to encode the signal, up to 8 bits can be represented by any one particular code word (assuming an 11 Mbps bit stream).

It is the case that, for most symbol modulation schemes, the Decision Feedback Equalizer adequately performs notwithstanding the difficulty of providing symbol estimates $\hat{a}_k$. This is because the estimation is done on a symbol-by-symbol basis.

It would be highly desirable to provide a DFE that exploits the fact that when a symbol is received, there is a relationship between the other symbols before and after it, e.g., if it is in the middle of a CCK code word.

Past efforts have relied upon providing equalization first and, then perform the CCK decoding. However, it would be highly desirable to provide both CCK modulation decoding and equalization at the same time.

SUMMARY OF THE INVENTION

An object of this invention is to provide an improved system and method for decoding CCK-encoded digital data streams implementing a trellis-decoding technique.

Another object of the present invention is to provide an improved receiver device for use in digital communication systems implementing the IEEE 802.11b high rate digital communications standard that implements a novel, computationally efficient trellis decoding technique for decoding CCK encoded symbols.

These and other objectives are attained with a method and system for performing joint equalization and decoding of Complementary Code Key (CCK) encoded symbols. The system comprises: a decision feedback equalizer (DFE) structure for simulating an inverse communications channel response and providing an output comprising an estimation of the received symbols, the DFE structure including a forward equalizer path and a feedback equalizer path including a feedback filter; and, a CCK decoder embedded in the feedback path and operating in conjunction with a feedback filter therein for decoding the chips based on intermediate DFE outputs including those chips corresponding to past decoded CCK symbols. Decisions on a symbol chip at a particular time are not made until an entire CCK codeword that the chip belongs to is decoded, thereby reducing errors propagated when decoding the symbols.

Advantageously, the trellis decoding method is implemented as a computationally efficient 64-state trellis.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The present invention is directed to a digital communications system and a computationally efficient decoding structure for decoding data received in the form of symbols modulated according to Complementary Code Keying (CCK) technique. The system of the invention will be described herein for the case of an 11 Mbps digital data stream in accordance with the IEEE 802.11b standard, however, it is understood that skilled artisans may readily apply the principles described herein to other bit stream data rates in accordance with the standard, e.g., 5.5 Mbps.

Figure 1:
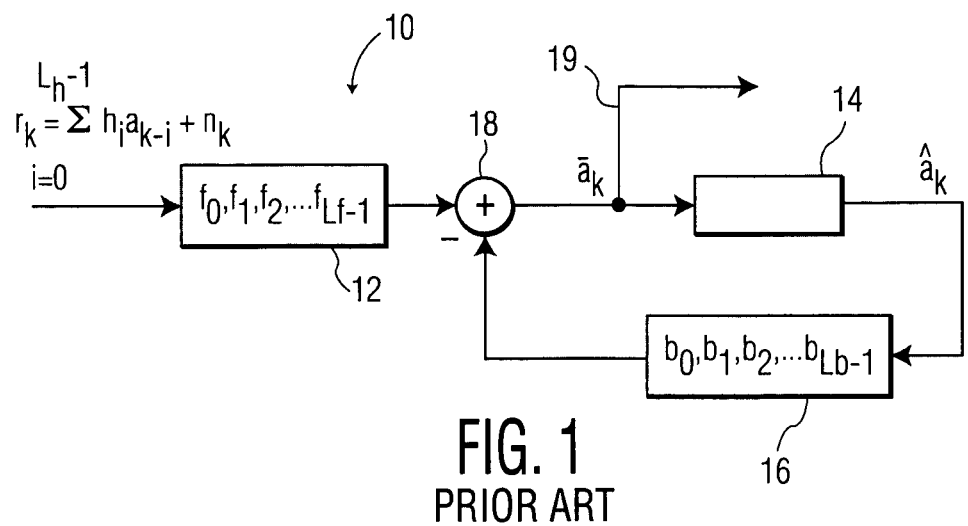
FIG. 1 illustrates generally a DFE equalizer structure according to the prior art.
Figure 2:
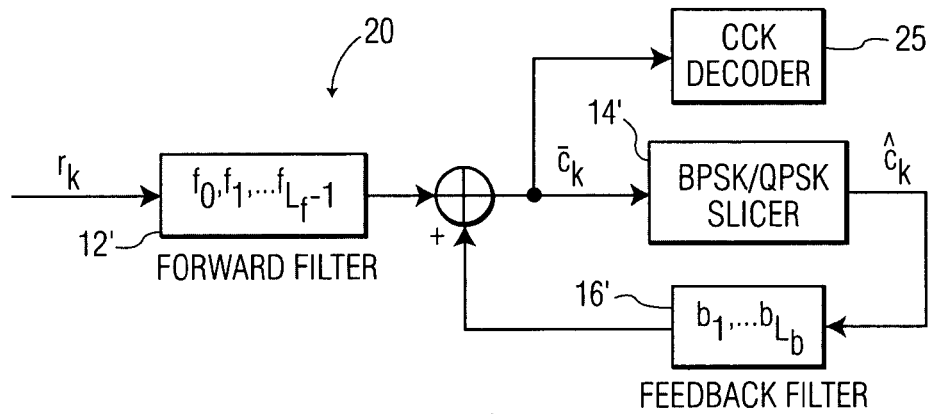
FIG. 2 depicts the joint DFE and CCK decoding technique according to a first embodiment of the invention.

In a first embodiment of the invention, as shown in FIG. 2, the system includes a receiver device comprising, in part, a Decision Feedback Equalizer ("DFE") 20 such as the equalizer used in a 802.11b communications receiver. The DFE 20 may be a fractionally spaced decision-feedback equalizer (DFE) having a forward filter 12' with taps that are fractionally (T/2) spaced. This forward filter 12' will perform both matched filtering and equalization. The equalizer 20 further includes a feedback filter 16' that may be sample spaced, i.e., T spaced, where "T" denotes the sample rate, which is also the chip rate, e.g., 11 MHz. The input to the equalizer 20 is assumed to be T/2 spaced, i.e., sampled at 22 MHz. The DFE 20 may be used for all the possible 802.11b communications modes, i.e., 1, 2, 5.5 and 11 Mbps. In the first embodiment, as shown in FIG. 2, the input to the feedback filter section 16' comprises the output of the slicer 14', which provides an estimate of the true transmitted chips and may include either a BPSK or QPSK slicer, depending on the transmitted mode. Equation (1) describes this structure as follows:

$$\tilde{c}_k = \sum_{i=0}^{L_f-1} f_i r_{2k+d_f-i} + \sum_{i=1}^{L_b} b_i \hat{c}_{k-i} \quad (1)$$

where, $f_i$ are the forward equalizer taps, $b_i$ are the feedback equalizer taps, $r_k$ is the received input stream at T/2 rate, $\tilde{c}_k$ is the DFE equalizer output at T rate, $L_f$ is the length of the forward filter, $d_f$ is the delay through the forward filter, $L_b$ is the length of the feedback filter, and $\hat{c}_k$ is the slicer output which is an estimate of the true transmitted chip $c_k$. As shown in FIG. 2, there is provided a CCK decoder 25 for providing the decoding of the received chips. It should be understood that in other embodiments, the decode element 25 may comprises a typical Barker despreader, for the low-rate modes. The input to the CCK decoder 25 is $\tilde{c}_k$. It is readily seen that, in this embodiment, equalization and CCK decoding/Barker dispreading are completely separated and, as such, may be subject to propagation errors due to errors made by the slicer.

Figure 3:
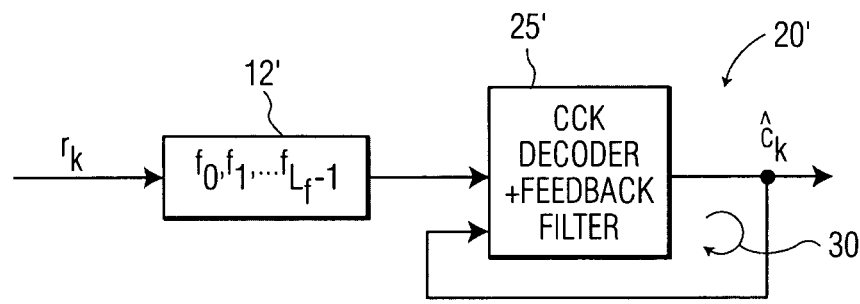
FIG. 3 depicts the joint DFE and CCK decoding technique according to a preferred embodiment of the invention; and, FIG. 4 depicts the generated trellis structure underlying the joint DFE and CCK decoding technique of the invention.

For improved performance, in a preferred embodiment, the DFE structure 20' illustrated in FIG. 3 is implemented. In accordance with the configuration illustrated in FIG. 3, the CCK decoder/Barker despreader device 25' is embedded into a DFE feedback loop 30 including the feedback filter. Decoding and equalization is done on a block of eight chips for the CCK modes and on eleven chips for DSSS modes.

Equation 2) describes the structure for the CCK mode as follows:

$$\tilde{c}_{k+j} = \sum_{i=0}^{L_f-1} f_i r_{2(k+j)+d_f-i} + \sum_{i=1}^{L_b} b_i \tilde{c}_{k+j-i}, \quad j = 0, 1, \ldots 7 \quad (2)$$

$$= \sum_{i=0}^{L_f-1} f_i r_{2(k+j)+d_f-i} + \sum_{i=j+1}^{L_b} b_i \hat{c}_{k+j-i} + \sum_{i=1}^{j} b_i c_{k+j-i}$$

$$= s_{k+j} + \sum_{i=1}^{j} b_i c_{k+j-i}$$

where $$s_{k+j} = \sum_{i=0}^{L_f-1} f_i r_{2(k+j)+d_f-i} + \sum_{i=j+1}^{L_b} b_i \hat{c}_{k+j-i} \quad j = 0, \ldots 7$$

represents the intermediate DFE equalizer outputs that include, in the feedback filter, only those chips corresponding to past decoded CCK symbols and the $$\sum_{i=1}^{j} b_i c_{k+j-i}$$

component represents the chips comprising the present transmitted symbol. According to the invention, the CCK decoder 20' then chooses, from the set of 256 possible codewords, that codeword $[c_0, c_1, \ldots, c_7]$ that minimizes the metric set forth in equation 3) as follows:

$$\sum_{j=0}^{7} \left| s_{k+j} + \sum_{i=1}^{j} b_i c_{j-i} - c_j \right|^2 \quad (3)$$

It is understood that similar equations may be written for the DSSS modes except that blocks of 11 chips at a time would be considered and that there are only 2, or 4 possible 11-chip words.

The configuration in accordance with the preferred embodiment greatly reduces error propagation, as decisions on the chip at time k are not made until the entire CCK codeword that the chip belongs to is decoded. The complexity of this solution is greater than the configuration in accordance with the first embodiment (FIG. 2), however, according to the preferred embodiment of the invention, a computationally efficient decoding method employing a trellis structure is provided, as will be described.

According to this method, the variable $\underline{c}=[c_0, c_1, \ldots, c_7]$ represents the 8-symbol CCK codeword. The symbols in the codeword "$\underline{c}$" are expressed in terms of the four QPSK phases $\phi_1, \phi_2, \phi_3$ and $\phi_4$ used to create the CCK codes according to equation 4) as follows:

$$\underline{c} = \left[ e^{j(\phi_1+\phi_2+\phi_3+\phi_4)}, e^{j(\phi_1+\phi_3+\phi_4)}, e^{j(\phi_1+\phi_2+\phi_4)}, \right. \quad (4)$$
$$\left. -e^{j(\phi_1+\phi_4)}, e^{j(\phi_1+\phi_2+\phi_3)}, e^{j(\phi_1+\phi_3)}, -e^{j(\phi_1+\phi_2)}, -e^{j(\phi_1)} \right]$$

As the phase $\phi_1$ is common to all the symbols in a codeword, the following definitions for values $\alpha_1$, $\alpha_2$ and $\alpha_3$ are provided according to equation 5) as follows:

$$\alpha_1 = \phi_2 + \phi_3 + \phi_4$$

$$\alpha_2 = \phi_3 + \phi_4$$

$$\alpha_3 = \phi_2 + \phi_4 \quad (5)$$

Thus, the CCK codeword $\underline{c}$ may be re-written in terms of the variables $\alpha_i$ and $\phi_1$ according to equation 6) as follows:

$$\underline{c} = e^{j\phi 1}[e^{j\alpha 1}, e^{j\alpha 2}, e^{j\alpha 3}, -e^{j(\alpha 2 + \alpha 3 - \alpha 1)}, \quad (6)$$

$$e^{j(2\alpha 1 - \alpha 2 - \alpha 3)}, e^{j(\alpha 1 - \alpha 3)}, -e^{j(\alpha 1 - \alpha 2)}, 1]$$

In other words, the codeword $\underline{c}$ may be expressed as: $\underline{c} = e^{j\phi 1}\underline{d}$, where $\underline{d}$ is a function of $\alpha_1$, $\alpha_2$ and $\alpha_3$ as shown in equation 6). Each of the $\alpha_i$ may take on one of 4 values [0, $\pi/2$, $\pi$, $3\pi/2$] and hence $\underline{d}$ belongs to a set of 64 possible vectors, whereas $\underline{c}$ can have 256 possible values. Utilizing a brute force methodology, the embedded CCK decoder may be programmed to choose from the set of 256 possible code words (a number 8 symbols long), that minimizes the metric, and use the corresponding $c_0, c_1, \ldots, c_7$ values. For this brute force minimization, this value would be computed 256 times (for each of the 256 possible combinations that could be transmitted) with the combination that minimizes this metric distance being picked.

Figure 4:
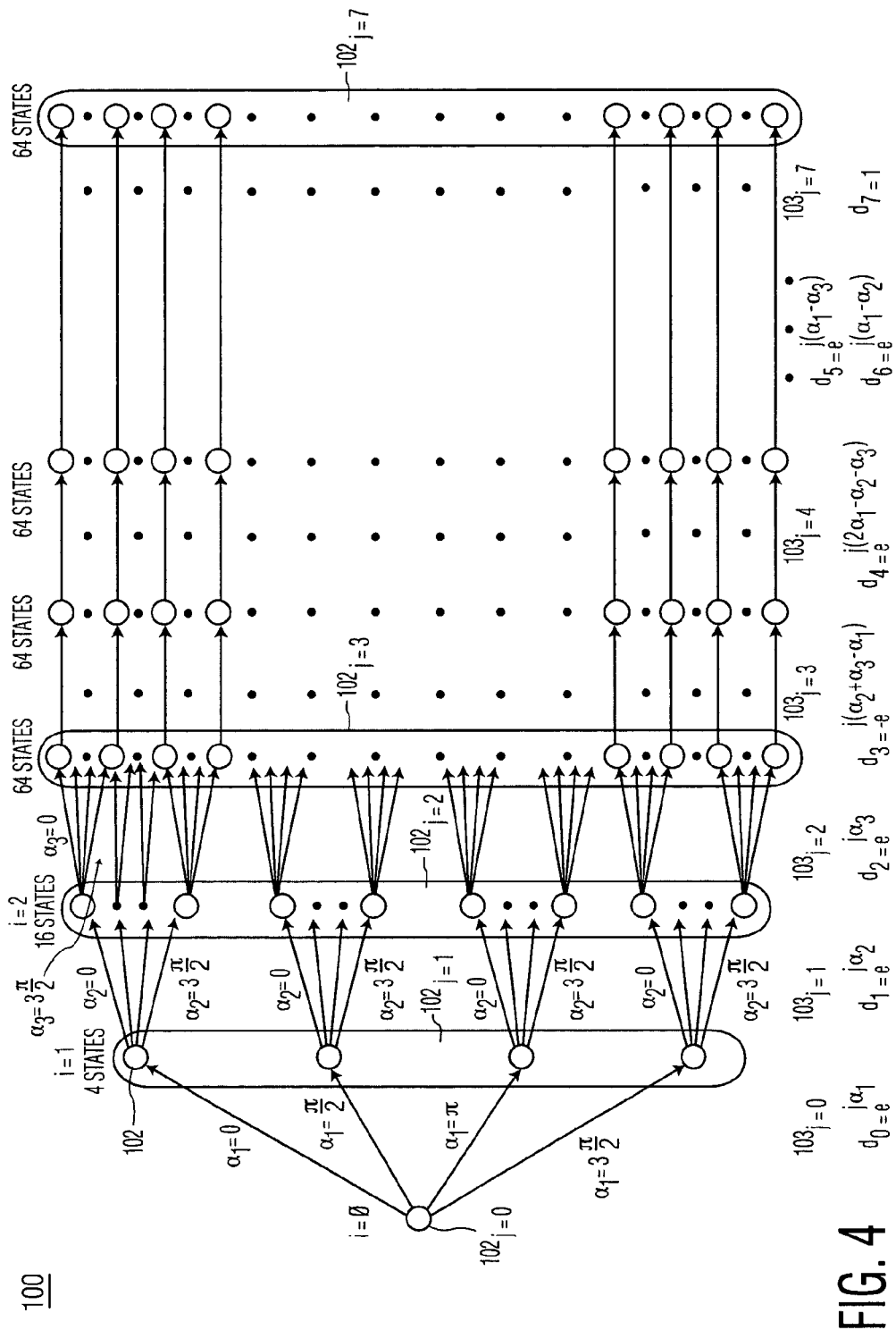

According to the preferred embodiment, however, rather than a brute force methodology, a trellis structure may be used because of the memory effect of the feedback filter in the DFE feedback loop 30 (FIG. 3). That is, the eight intermediate outputs $s_{k+j}$, $j=0, 1, \ldots, 7$, are processed by the trellis to determine the transmitted codeword at time k. Advantageously, as will be described, the dimensionality of a trellis search may be reduced from 256 to 64. That is, as shown in FIG. 4, a trellis structure 100 is generated which represents basically as a state diagram having an initial state 102$_{j=0}$, whereby, in the case of a multi-path channel and considering only the contribution in the feedback filter from symbols in the present CCK code word, the maximum number of states 102 in a corresponding set 102$_{j=0}, \ldots,$ 102$_{j=7}$ at each corresponding level 103$_{j=0}, \ldots,$ 103$_{j=7}$ (equal to eight (8) levels), grows up to a maximum of sixty-four (64). Preferably, the trellis structure is embodied as an algorithm executing in hardware provided in the combined CCK decoder/equalizer feedback filter structure (FIG. 3), however, it could easily be executed in software.

In the description of how the programmed trellis structure and algorithm of FIG. 4 operates to process the block of eight symbols $s_{k+j}$, reference is had to equation 3, which sets forth the metric to be minimized and which may be re-written in terms of variables $\underline{d}$ and $\phi_1$ according to equations 7) and 8) as follows:

$$\sum_{j=0}^{7}\left|s_{k+j} + \sum_{i=0}^{j} b_i c_{j-i}\right|^2 \quad (7)$$

where $b_0 = -1$; and, using the relation $c_i = e^{j\phi 1}d_i$, the following equation 8) is obtained:

$$\sum_{j=0}^{7}\left|s_{k+j} + e^{j\phi 1}\sum_{i=0}^{j} b_i d_{j-i}\right|^2 = \sum_{j=0}^{7}\left[|s_{k+j}|^2 + \left|\sum_{i=0}^{j} b_i d_{j-i}\right|^2 + 2\text{Re}\left(s^*_{k+j} e^{j\phi 1}\sum_{i=0}^{j} b_i d_{j-i}\right)\right] \quad (8)$$

where Re denotes a real part and * denotes complex conjugate. Minimizing the above equation is equivalent to minimizing the metric according to equation 9) as follows:

$$\sum_{j=0}^{7}\left|\sum_{i=0}^{j} b_i d_{j-i}\right|^2 + 2\text{Re}\left[e^{j\phi i}\sum_{j=0}^{7} s^*_{k+j}\sum_{i=0}^{j} b_i d_{j-i}\right] \quad (9)$$

Defining now the term $$\chi_j = \sum_{i=0}^{j} b_i d_{j-i}.$$

then, the metric to be minimized may be set forth according to equation 10) as follows:

$$\sum_{j=0}^{7}|\chi_j|^2 + 2\text{Re}\left[e^{j\phi 1}\sum_{j=0}^{7} s^*_{k+j}\chi_j\right] \quad (10)$$

Returning to FIG. 4, a state in the trellis 100 is defined by the vector $[\alpha_1, \alpha_2, \alpha_3]$ and a block of eight (8) symbols $s_{k+j}$, $j=0, 1, \ldots, 7$, are processed by the trellis as follows: At each time, j, the following quantities are calculated for each state 102 in the set 102$_{j=0}, \ldots,$ 102$_{j=7}$ as follows: $\chi_j$, a real-valued $m_1(j) = |\chi_j|^2$ and a complex-valued $m_2(j) = s^*_{k+j}\chi_j$. Substituting these values into equation 10), the metric to be minimized may now be set forth according to equation 11) as follows:

$$\sum_{j=0}^{7} m_1(j) + 2\text{Re}\left[e^{j\phi 1}\sum_{j=0}^{7} m_2(j)\right] \quad (11)$$

Thus, for every branch in a trellis path, two (2) quantities need to be computed: a real-valued $m_1(j) = |\chi_j|^2$ and a complex-valued $m_2(j) = s^*_{k+j}\chi_j$. These quantities are then added to the corresponding quantities of the state from which the branch originated. Unlike the trellis decoding in a convolutional code, here there is only one branch coming into any state and hence there is no "survivor path". At 102$_{j=0}$ there are 4 possible paths corresponding to the 4 possible values of $\alpha_1$, at 102$_{j=1}$ there are 16 possible paths corresponding to the 16 possible combinations of $[\alpha_1, \alpha_2]$, at 102$_{j=2}$ there are 64 possible paths corresponding to the 64 possible combinations of $[\alpha_1, \alpha_2, \alpha_3]$ and after that the trellis size does not grow since all succeeding values of $d_j$ are functions of the same three phases, as shown in equation (6). After the entire codeword has been received, i.e., at the end of the trellis 100 when $102_{j=7}$ at level $103_{j=7}$, for each of the 64 states the metric set forth in equation 11) is calculated for each of the 4 possible values of $\varnothing_1$ for a total of 256 values. Then, the state and $\varnothing_1$ value is chosen that corresponds to the minimum metric. The vector $[\alpha_1, \alpha_2, \alpha_3]$ corresponding to the state with the minimum metric along with the $\varnothing_1$ value is then used to calculate the transmitted codeword c.

It should be understood that the extra quantity $m_1(j)$ has to be computed in the equation 11), because, in general, this term will be a function of the codeword and the filter taps. In the absence of multipath, i.e., $b_0=-1$ and $b_j=0$ elsewhere, it is easy to see that $m_1(j)=1$ always, and hence does not contribute towards the final metric.

As shown in FIG. 4, at each state, the trellis structure moves to four (4) other values, depending upon what the so value was because that goes into $b_0$ (equation 3). Then from each value, the trellis may branch into four other values. It is readily seen that, if at every state 102*a*, . . . , 102*n* in the trellis there may be four possible inputs corresponding to four different values, then the structure would grow exponentially and basically end up with a number of combinations (states) equal to $4^8$. However, according to the CCK structure, this trellis structure only moves to 64 states (i.e., 102*c*, . . . , 102*n*) and then saturates. This is because all of the eight symbols may be expressed in terms of just three (phase) values $\alpha_1, \alpha_2$ and $\alpha_3$, i.e., each of these three phases can take one of four values so there is $4^3=64$ possible combinations which makes the trellis structure extremely manageable.

While it is apparent that the invention herein disclosed is well calculated to fulfill the objects stated above, it will be appreciated that numerous modifications and embodiment may be devised by those skilled in the art, and it is intended that the appended claims cover all such modifications and embodiments as fall within the true spirit and scope of the present invention.

What is claimed is:

1. In a communications system including a receiver device for receiving symbols communicated via a communications channel and encoded according to a Complementary Code Key (CCK) chip encoding scheme, a system for decoding received CCK encoded symbols (chips), said system comprising:
   a decision feedback equalizer (DFE) structure for receiving and equalizing CCK-encoded symbols communicated over a communications channel, and providing an output comprising an estimation of said received symbols, said DFE structure including a forward equalizer path and a feedback equalizer path including a feedback filter;
   a CCK decoder means embedded in said feedback path and operating in conjunction with a feedback filter therein for decoding said chips, said decoding of CCK chips being based on intermediate DFE outputs including those chips corresponding to past decoded CCK symbols,
   wherein decisions on a symbol chip at a particular time are not made until an entire CCK codeword that the chip belongs to is decoded, thereby reducing errors propagated when decoding said symbols.

2. The system according to claim 1, wherein the decoding and equalization are performed on a block of eight 8 chips of said intermediate DFE outputs ($\tilde{c}_{k+j}$) for CCK modes.

3. The system according to claim 2, wherein estimated DFE equalizer outputs $\tilde{c}_{k+j}$ for CCK mode symbols is governed according to the equation:

$$\tilde{c}_{k+j} = s_{k+j} + \sum_{i=1}^{j} b_i c_{k+j-i},$$

where $$s_{k+j} = \sum_{i=0}^{L_f-1} f_i r_{2(k+j)+d_f-i} + \sum_{i=j+1}^{L_b} b_i \hat{c}_{k+j-i}$$

j=0, . . . 7 and represents the intermediate DFE equalizer outputs that include, in the feedback filter, only those chips corresponding to past decoded CCK symbols, $f_i$ are forward equalizer taps, $b_i$ are feedback equalizer taps, $r_k$ represents a received input stream at a specified rate, $L_f$ represents a length of the forward filter, $d_f$ represents a delay through the forward filter, $L_b$ represents a length of the feedback filter, and $\hat{c}_k$ represents a slicer output which is an estimate of the true transmitted chip $c_k$, and the $$\sum_{i=1}^{j} b_i c_{k+j-i}$$

component represents the chips comprising the present transmitted symbol.

4. The system according to claim 3, wherein the CCK decoder includes means for choosing from a set of possible CCK codewords, a codeword $\underline{c}=[c_0, c_1, \ldots c_7]$ that minimizes a metric comprising:

$$\sum_{j=0}^{7} \left| s_{k+j} + \sum_{i=1}^{j} b_i c_{j-i} - c_j \right|^2.$$

5. The system according to claim 4, wherein the codeword $\underline{c}$ is represented in terms of variables $\alpha_i$ and $\varnothing_1$ according to $\underline{c}=e^{j\varphi_1}\underline{d}$ where $\underline{d} \, [e^{j\alpha_1}, e^{j\alpha_2}, e^{j\alpha_3}, -e^{j(\alpha_2+\alpha_3-\alpha_1)}, e^{j(2\alpha_1-\alpha_2-3)}, e^{j(\alpha_1-\alpha_3)}, -e^{j(\alpha_1-\alpha_2)}, 1]$ and each of $\alpha_i$ comprises one of four (4) values $[0, \pi/2, \pi, 3\pi/2]$, whereby $\underline{d}$ belongs to a set of 64 possible state vectors, and $\underline{c}$ may have 256 possible values.

6. The system according to claim 5, wherein the CCK decoder includes trellis decoding means for generating a trellis structure having a plurality of trellis paths representing possible states of said codeword $\underline{c}$, wherein a state in the trellis structure is represented by the vector $[\alpha_1, \alpha_2, \alpha_3]$.

7. The system according to claim 6, wherein said metric to be minimized is governed according to:

$$\sum_{j=0}^{7} |\chi_j|^2 + 2\text{Re}\left[ e^{j\varphi_1} \sum_{j=0}^{7} s^*_{k+j} \chi_j \right] \text{ where } \chi_j = \sum_{i=0}^{j} b_i d_{j-i}.$$

8. The system according to claim 7, wherein the metric to be minimized is governed according to $$\sum_{j=0}^{7} m_1(j) + 2\text{Re}\left[e^{j\phi 1}\sum_{j=0}^{7} m_2(j)\right] \text{ where } m_1(j) = |\chi_j|^2$$

and is a real-valued quantity, and $m_2(j)=s^*_{k+j}\chi_j$ and is a complex-valued quantity, said trellis decoder structure including means for processing a block of eight (8) intermediate output symbols $s_{k+j}$, $j=0, 1, \ldots, 7$, including means for calculating, at each time, j, for each branch in a trellis path, said $m_1(j)$ and $m_2(j)$ quantities; and, means for adding $m_1(j)$ and $m_2(j)$ quantities to the corresponding quantities of the state from which the trellis branch originated, whereby the eight intermediate outputs $s_{k+j}$, $j=0, 1, \ldots, 7$, are processed by the trellis to determine the transmitted codeword at time k.

9. The system according to claim 8, wherein said calculating means includes calculating, for each codeword state, the $$\sum_{j=0}^{7} m_1(j) + 2\text{Re}\left[e^{j\phi 1}\sum_{j=0}^{7} m_2(j)\right]$$

metric for each of four $\phi_1$ values $[0, \pi/2, \pi, 3\pi/2]$, said means further choosing a state vector $[\alpha_1, \alpha_2, \alpha_3]$ and $\phi_1$ that results in the minimum metric and calculating the transmitted codeword $\underline{c}$ accordingly therefrom, wherein a dimensionality of said trellis decoding means is reduced from 256 to 64.

10. A method for decoding symbols encoded according to a Complementary Code Key (CCK) chip encoding scheme, said method comprising the steps of:
  a) providing a decision feedback equalizer (DFE) structure for receiving and equalizing CCK-encoded symbols (chips) communicated over a communications channel, said DFE structure further estimating said received symbols for DFE output, said DFE structure including a forward equalizer path and a feedback equalizer path including a feedback filter;
  b) embedding a CCK decoder means in said feedback path for decoding said chips in conjunction with filter taps of determined for said feedback filter; and,
  c) decoding of said CCK chips based on intermediate DFE outputs including those chips corresponding to past decoded CCK symbols,
  wherein decisions on a symbol chip at a particular time are not made until an entire CCK codeword that the chip belongs to is decoded, thereby reducing errors propagated when decoding said symbols.

11. The method according to claim 10, wherein the decoding and equalization steps are performed on a block of eight 8 chips of said intermedeate DFE outputs ($\tilde{c}_{k+j}$) for CCK modes.

12. The method according to claim 11, wherein said estimating step includes calculating estimated DFE equalizer outputs $\tilde{c}_{k+j}$ for CCK mode symbols according to:

$$\tilde{c}_{k+j} = s_{k+j} + \sum_{i=1}^{j} b_i c_{k+j-i},$$

where $$s_{k+j} = \sum_{i=0}^{L_f-1} f_i r_{2(k+j)+d_f-i} + \sum_{i=j+1}^{L_b} b_i \hat{c}_{k+j-i}$$

$j=0, \ldots 7$ and represents the intermediate DFE equalizer outputs that include, in the feedback filter, only those chips corresponding to past decoded CCK symbols, $f_i$ are forward equalizer taps, $b_i$ are feedback equalizer taps, $r_k$ represents a received input stream at a specified rate, $L_f$ represents a length of the forward filter, $d_f$ represents a delay through the forward filter, $L_b$ represents a length of the feedback filter, and $\hat{c}_k$ represents a slicer output which is an estimate of the true transmitted chip $c_k$, and the $$\sum_{i=1}^{j} b_i c_{k+j-i}$$

component represents the chips comprising the present transmitted symbol.

13. The method according to claim 12, further including the step of: choosing from a set of possible CCK codewords, a codeword $\underline{c}=[c_0, c_1, \ldots, c_7]$ that minimizes a metric comprising:

$$\sum_{j=0}^{7} \left| s_{k+j} + \sum_{i=1}^{j} b_i c_{j-i} - c_j \right|^2.$$

14. The method according to claim 13, wherein the codeword $\underline{c}$ is represented in terms of variables $_j$ and $\phi_1$ according to $\underline{c}=e^{j\Phi 1}\underline{d}$ where $\underline{d}=\lfloor e^{j\alpha 1}, e^{j\alpha 2}, e^{j\alpha 3}, -e^{j(\alpha 2+\alpha 3-\alpha 1)}, e^{j(2\alpha 1-\alpha 2-\alpha 3)}, e^{j(\alpha 1-\alpha 3)}, -e^{j(\alpha 1-\alpha 2)}, 1 \rfloor$
  and each of $\alpha_i$ comprises one of four (4) values $[0, \pi/2, \pi, 3\pi/2]$, whereby $\underline{d}$ belongs to a set of 64 possible vectors, and $\underline{c}$ may have 256 possible values.

15. The method according to claim 14, wherein said decoding step c) further includes the step of generating a trellis structure having a plurality of trellis paths representing possible states of said codeword $\underline{c}$, wherein a state in the trellis structure is represented by the vector $[\alpha_1, \alpha_2, \alpha_3]$.

16. The method according to claim 15, wherein said metric to be minimized is governed according to:

$$\sum_{j=0}^{7} |\chi_j|^2 + 2\text{Re}\left[e^{j\phi 1}\sum_{j=0}^{7} s^*_{k+j}\chi_j\right] \text{ where } \chi_j = \sum_{i=0}^{j} b_i d_{j-i}.$$

17. The method according to claim 16, wherein the metric to be minimized is governed according to $$\sum_{j=0}^{7} m_1(j) + 2\text{Re}\left[e^{j\phi 1}\sum_{j=0}^{7} m_2(j)\right] \text{ where } m_1(j) = |\chi_j|^2$$

and is a real-valued quantity, and $m_2(j)=s^*_{k+j}\chi_j$ and is a complex-valued quantity, said trellis generating step further including the steps of:
processing a block of eight (8) intermediate output symbols $s_{k+j}$, j=0, 1, . . . , 7, including means for calculating, at each time, j, for each branch in a trellis path, said $m_1(j)$ and $m_2(j)$ quantities; and,
adding said $m_1(j)$ and $m_2(j)$ quantities to the corresponding quantities of the state from which the trellis branch originated, whereby the eight intermediate outputs $s_{k+j}$, j=0, 1, . . . , 7, are processed by the trellis to determine the transmitted codeword at time k.

18. The method according to claim 17, wherein the calculating step further includes the steps of:
calculating, for each codeword state, the $$\sum_{j=0}^{7} m_1(j) + 2\text{Re}\left[e^{j\phi 1}\sum_{j=0}^{7} m_2(j)\right]$$

metric for each of four $\phi_1$ values [0, $\pi/2$, $\pi$, $3\pi/2$]; and,
choosing a state vector $[\alpha_1, \alpha_2, \alpha_3]$ and $\phi_1$ that results in the minimum metric and calculating the transmitted codeword $\underline{c}$ accordingly therefrom, wherein a dimensionality of said trellis structure is reduced from 256 to 64.

19. A receiver device for receiving symbols communicated via a communications channel, said symbols encoded according to a Complementary Code Key (CCK) chip encoding scheme, said receiver device comprising:
a decision feedback equalizer (DFE) structure for receiving and equalizing CCK-encoded symbols (chips) communicated over a communications channel, and providing an output comprising an estimation of said received symbols, said DFE structure including a forward equalizer path and a feedback equalizer path including a feedback filter;
a CCK decoder means embedded in said feedback path and operating in conjunction with a feedback filter therein for decoding said chips, said decoding of CCK chips being based on intermediate DFE outputs including those chips corresponding to past decoded CCK symbols,
wherein decisions on a symbol chip at a particular time are not made until an entire CCK codeword that the chip belongs to is decoded, thereby reducing errors propagated when decoding said symbols.

20. The receiver device according to claim 19, wherein the decoding and equalization are performed on a block of eight 8 chips of said intermediate DFE outputs ($\tilde{c}_{k+j}$) for CCK modes.

21. The receiver device according to claim 20, wherein estimated DFE equalizer outputs $\tilde{c}_{k+j}$ for CCK mode symbols is governed according to the equation:

$$\tilde{c}_{k+j} = s_{k+j} + \sum_{i=1}^{j} b_i c_{k+j-i},$$

where $$s_{k+j} = \sum_{i=0}^{L_f-1} f_i r_{2(k+j)+d_f-i} + \sum_{i=j+1}^{L_b} b_i \hat{c}_{k+j-i}$$

j=0, . . . 7 and represents the intermediate DFE equalizer outputs that include, in the feedback filter, only those chips corresponding to past decoded CCK symbols, $f_i$ are forward equalizer taps, $b_i$ are feedback equalizer taps, $r_k$ represents a received input stream at a specified rate, $L_f$ represents a length of the forward filter, $d_f$ represents a delay through the forward filter, $L_b$ represents a length of the feedback filter, and $\hat{c}_k$ represents a slicer output which is an estimate of the true transmitted chip $c_k$, and the $$\sum_{i=1}^{j} b_i c_{k+j-i}$$

component represents the chips comprising the present transmitted symbol.

22. The receiver device according to claim 21, wherein the CCK decoder includes means for choosing from a set of possible CCK codewords, a codeword $\underline{c}=[c_0, c_1, \ldots, c_7]$ that minimizes a metric comprising:

$$\sum_{j=0}^{7}\left|s_{k+j} + \sum_{i=1}^{j} b_i c_{j-i} - c_j\right|^2.$$

23. The receiver device according to claim 22, wherein the codeword $\underline{c}$ is represented in terms of variables $_i$ and $\phi_1$ according to $\underline{c}=e^{j\Phi 1}\underline{d}$ where $\underline{d}=\lfloor e^{j\alpha 1}, e^{j\alpha 2}, e^{j\alpha 3}, -e^{j(\alpha 2+\alpha 3-\alpha 1)}, e^{j(2\alpha 1-\alpha 2-\alpha 3)}, e^{j(\alpha 1-\alpha 3)}, -e^{j(\alpha 1-\alpha 2)}, 1\rfloor$
and each of $\alpha_i$ comprises one of four (4) values [0, $\pi/2$, $\pi$, $3\pi/2$], whereby $\underline{d}$ belongs to a set of 64 possible vectors, and $\underline{c}$ may have 256 possible values.

24. The receiver device according to claim 23, wherein the CCK decoder includes trellis decoding means for generating a trellis structure having a plurality of trellis paths representing possible states of said codeword $\underline{c}$, wherein a state in the trellis structure is represented by the vector $[\alpha_1, \alpha_2, \alpha_3]$.

25. The receiver device according to claim 24, wherein said metric to be minimized is governed according to:

$$\sum_{j=0}^{7}|\chi_j|^2 + 2\text{Re}\left[e^{j\phi 1}\sum_{j=0}^{7} s^*_{k+j}\chi_j\right] \text{ where } \chi_j = \sum_{i=0}^{j} b_i d_{j-i}.$$

26. The receiver device according to claim 25, wherein the metric to be minimized is governed according to $$\sum_{j=0}^{7} m_1(j) + 2\text{Re}\left[e^{j\phi 1}\sum_{j=0}^{7} m_2(j)\right]$$

where $m_1(j)=|\chi_j|^2$ and is a real-valued quantity, and $m_2(j)=s^*_{k+j}\chi_j$ and is a complex-valued quantity, said trellis decoder structure including means for processing a block of eight (8) intermediate output symbols $s_{k+j}$, j=0, 1, . . . , 7, including means for calculating, at each time, j, for each branch in a trellis path, said $m_1(j)$ and $m_2(j)$ quantities; and, means for adding $m_1(j)$ and $m_2(j)$ quantities to the corresponding quantities of the state from which the trellis branch originated, whereby the eight intermediate outputs $s_{k+j}$, j=0, 1, . . . , 7, are processed by the trellis to determine the transmitted codeword at time k.

27. The receiver device according to claim 26, wherein said calculating means includes calculating, for each codeword state, the $$\sum_{j=0}^{7} m_1(j) + 2\mathrm{Re}\left[e^{j\phi 1}\sum_{j=0}^{7} m_2(j)\right]$$

metric for each of four $\phi_1$ values $[0, \pi/2, \pi, 3\pi/2]$, said means further choosing a state vector $[\alpha_1, \alpha_2, \alpha_3]$ and $\phi_1$ that results in the minimum metric and calculating the transmitted codeword $\underline{c}$ accordingly therefrom, wherein a dimensionality of said trellis decoding means is reduced from 256 to 64.

28. The system according to claim 1, wherein the CCK decoder includes a trellis decoder having a number of trellis paths, wherein said number of trellis paths is less than all possible states of said entire CCK codeword that the chip belongs to.

29. The method according to claim 10, wherein said decoding step c) further includes the step of generating a trellis structure having a number of trellis paths, wherein said number of trellis paths is less than all possible states of said entire CCK codeword that the chip belongs to.

30. The receiver device according to claim 19, wherein the CCK decoder includes a trellis decoder having a number of trellis paths, wherein said number of trellis paths is less than all possible states of said entire CCK codeword that the chip belongs to.

* * * * *